United States Patent
Roskind et al.

(10) Patent No.: US 6,891,807 B2
(45) Date of Patent: May 10, 2005

(54) TIME BASED WIRELESS ACCESS PROVISIONING

(75) Inventors: James A. Roskind, Redwood City, CA (US); John D. Robinson, South Riding, VA (US)

(73) Assignee: America Online, Incorporated, Dulles, VA (US)

( * ) Notice: Subject to any disclaimer, the term of this patent is extended or adjusted under 35 U.S.C. 154(b) by 94 days.

(21) Appl. No.: 10/341,847

(22) Filed: Jan. 13, 2003

(65) Prior Publication Data

US 2004/0165546 A1 Aug. 26, 2004

(51) Int. Cl.[7] .......................... H04L 12/26; H04Q 7/34
(52) U.S. Cl. ..................... 370/255; 370/338
(58) Field of Search ................ 370/254, 255, 370/338; 455/422, 435, 410, 411; 380/247

(56) References Cited

U.S. PATENT DOCUMENTS

| | | | | |
|---|---|---|---|---|
| 5,461,627 A | * | 10/1995 | Rypinski | 370/346 |
| 6,058,106 A | | 5/2000 | Cudak et al. | 370/313 |
| 6,167,428 A | | 12/2000 | Ellis | 709/201 |
| 6,272,129 B1 | | 8/2001 | Dynarski et al. | 370/356 |
| 6,275,693 B1 | | 8/2001 | Lin et al. | 455/414 |
| 6,282,183 B1 | | 8/2001 | Harris et al. | 370/338 |
| 6,317,594 B1 | | 11/2001 | Gossman et al. | 455/414 |
| 6,334,056 B1 | | 12/2001 | Holmes et al. | 455/445 |
| 6,359,880 B1 | | 3/2002 | Curry et al. | 370/352 |
| 6,418,146 B1 | | 7/2002 | Miloslavsky | 370/400 |
| 6,418,324 B1 | | 7/2002 | Doviak et al. | 455/556 |
| 2001/0048744 A1 | * | 12/2001 | Kimura | 380/247 |
| 2003/0152235 A1 | * | 8/2003 | Cohen et al. | 380/278 |

FOREIGN PATENT DOCUMENTS

| | | | |
|---|---|---|---|
| EP | 814 623 | 12/1997 | H04Q/7/22 |
| EP | 999 672 | 5/2000 | H04L/12/28 |
| EP | 1 081 895 | 3/2001 | H04L/12/28 |
| EP | 1 126 681 | 8/2001 | H04L/29/06 |
| EP | 1 191 763 | 3/2002 | H04L/29/06 |
| EP | 1 225 778 | 7/2002 | H04Q/7/38 |
| JP | 2001-308866 | 11/2001 | H04L/12/28 |
| WO | WO 01/22661 | 3/2001 | H04L/12/28 |

OTHER PUBLICATIONS

*Microsoft Announces Wireless Provisioning Services*; Geek-Zone; Wi–Fi, posted Dec. 10, 2003 20:56:21 NZ.
*HP Spotlights Mobile Gear*; Ina Fried; CNET News.com; Oct. 13, 2003.
*Wireless Provisioning Services Overview*; The Cable Guy—Dec. 2003; TechNet Newsletter; 2004 Microsoft Corporation.

(Continued)

*Primary Examiner*—Melvin Marcelo
(74) *Attorney, Agent, or Firm*—Glenn Patent Group; Michael A. Glenn

(57) ABSTRACT

A method and apparatus is provided for the time-based provisioning of wireless devices. A network access point monitors operation of wireless devices within a service region. When provisioning logic is activated at the network access point, the access point determines if the tracked parameter (such as power on or the onset of signal transmission) of the wireless device occurs within a designated time interval from the time of the provisioning activation. If the tracked device qualifies, the network access point proceeds with provisioning the device. In one system embodiment, the network access point tracks the power on time of wireless devices. When a wireless device to be authorized is powered on, the provisioning logic at the network access point notes the power on time. The user then activates the provisioning access at the network access point, and the network access point provisions the wireless device if it is recently powered on.

71 Claims, 7 Drawing Sheets

OTHER PUBLICATIONS

Sony Ericsson Mobile Communications; *Sony Ericsson HBH–65* (Manual); Pub #LZT 1086746 R1A; $1^{st}$ Ed. Aug. 2003; Sony Ericsson Mobile Communications, AB.

*Security Issues for Wearable Computing and Bluetooth Technology*; Catharina Candolin, undated.

*Privacy and Authentication for Wireless Local Area Networks*; Ashar Aziz, and Whitfield Diffie; Sun Microsystems, Inc.; Jul. 26, 1993.

*Painting Your Home Blue [Bluetooth/sup TM/wireless Technology]*; D. Cypher; Proceedings 2002 IEEE $4^{th}$ International Workshop on Networked Appliancs; Jan. 15–16, 2002.

*Wireless Home Networks Based on a Hierarchical Bluetooth Scatternet Architecture*; W. Lilakiatsakun, A. Seneviratne; Proceedings Ninth IEEE International Conference on Networks; Oct. 10–12, 2001.

*Bluetooth Wireless Technology in the Home*; R. Sheperd; Electronics & Communication Engineering Journal; Oct. 2001.

*Wireless Gateway for Wireless Home AV Network and Its Implementation*; T. Saito, I. Imoda, Y. Takabatke, and K. Teramoto, and K. Fujimoto; IEEE Transactions on consumer Electronics; Aug. 2001.

*A Wireless Home Network and Its Application Systems*; H. Fujieda, Y. Horiike, T. Yamamoto, and T. Nomura; IEEE Transactions on Consumer Electronics; May 2000.

*Wireless Home Link*; M. Nakagawa; IEICE Transactions on Communications; Dec. 1999.

*An Access Protocol for a Wireless Home Network*; A.C.V. Gummalla, and J.O. Limb; WCNC. 1999 IEEE Wireless Communications and Networking Conference; Sep. 21–24, 1999.

*Firewalls for Security in Wireless Networks*; U. Murthy, O. Bukhres, W. Winn, and E. Vanderdez; Proceedings of the Thirty–First Hawaii International Conference on System sciences; Jan. 6–9, 1998.

*Self–Securing Ad Hoc Wireless Networks*; Haiyun Luo, Petros Aerfos, Jiejun Kng, Songwu Lu, and Lixia Zhang, undated.

*Wireless Networking for Control and Automation of Off–Road Equipment*; by J.D. Will; An ASAE Meeting Presentation, undated.

*Intrusion Detection in Wireless Ad–Hoc Networks*; Yongguang Zhang and Wenke Lee; Proceedings of the Sixth Annual International Conference on Mobile Computing and Networking; Aug. 6–11, 2000.

* cited by examiner

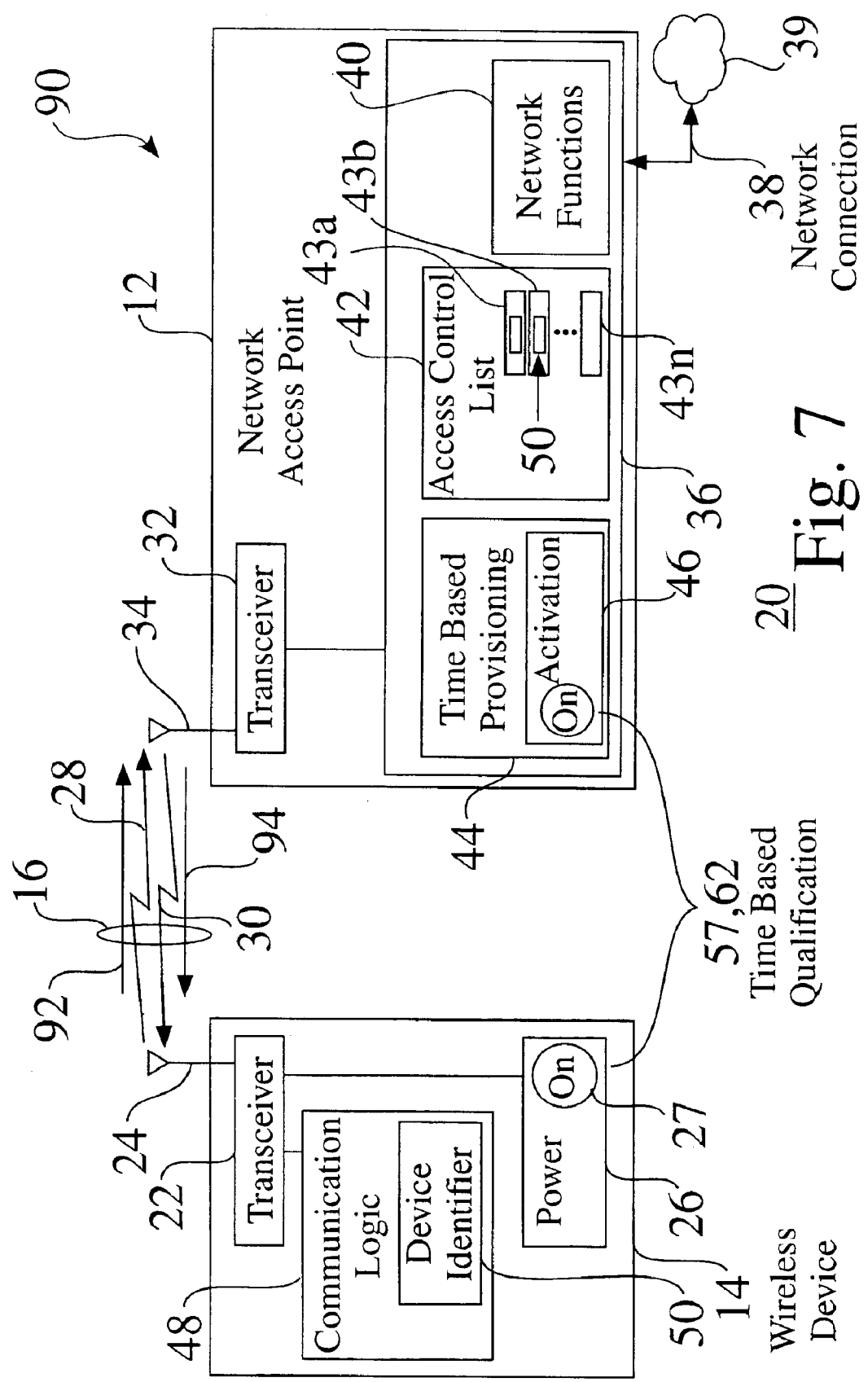

TIME BASED WIRELESS ACCESS PROVISIONING

FIELD OF THE INVENTION

The invention relates to the field of wireless connections between a wireless device and a network. More particularly, the invention relates to access provisioning between one or more wireless devices and an intranet access point.

BACKGROUND OF THE INVENTION

In local area networks, such as wireless home networks, one or more wireless devices, e.g. such as IEEE 802.11b devices, are linked to the network by a provisioning process through a network access point. When a user acquires a new wireless device, they need to securely tie it to their intranet, which comprises telling the intranet to accept wireless communications from the device, as well as provisioning the device with key material, such as for creating an encrypted connection. In conventional networks having one or more devices to be provisioned to a network access point, device identification information, such as a MAC address, is required to be communicated from the wireless device to the access point.

Several methods have been described for wireless access provisioning to integrate wireless devices into a network.

M. Cudak, B. Mueller, J. Kelton, and B. Classon, Network Protocol Method, Access Point Device and Peripheral Devices for Providing for an Efficient Centrally Coordinated Peer-to-Peer Wireless Communications Network, U.S. Pat. No. 6,058,106, disclose a "peer-to-peer wireless communications network wherein the access point device: (1) broadcasts a block assignment that specifies a wireless source peripheral device and a wireless destination peripheral device; (2) receives, from the wireless destination peripheral device, sequence information; (3) determines whether the sequence information represents one of: a negative acknowledgment and a positive acknowledgment with a sequence number; (4) forwards an acknowledgment to the wireless source peripheral based on the sequence information, and repeats steps (1)–(4) until N blocks of data, N a predetermined integer, have been transferred from the wireless source peripheral to the wireless destination peripheral."

J. Lin, P. Alfano, and S. Upp, Method and Apparatus for Performing Bearer Independent Wireless Application Service Provisioning, U.S. Pat. No. 6,275,693 disclose a provisioning system, in which a "mobile communication device contacts a provisioning proxy over the wireless bearer network, which in turns contacts a provisioning center over a public network. A provisioning tunnel is then established between the provisioning center and the mobile communication device. Once the provisioning tunnel is set up, the user of the mobile communication device can subscribe to, or unsubscribe from wireless application services."

Wireless Device Registering Method in Wireless Home Network, PCT Patent Application Ser. No. WO 01/2266, describes the sending of an authentication key to a device for storage, when an identification code received from the device corresponds to a code stored in an access point.

Secure Wireless LAN, European Pat. No. EP, 1081895, discloses wireless device use by a wireless device operator with an access point connected to a wired LAN in communication with the wireless device through air channel authentication.

C. Candolin, Security Issues for Wearable Computing and Bluetooth Technology, 23 Oct. 2000, Telecommunications Software and Multimedia Laboratory, Helsinki University of Technology, P.B. 400, FIN-02015 HUT, Finland, describes Bluetooth Technology as "a short-range wireless cable replacement technology enabling restricted types of ad hoc networks to be formed. All the while, a need for connecting wearable devices, such as PDAs, mobile phones, and mp3-players, is rising. Such networks may be formed using Bluetooth technology, but issues such as security must be taken into consideration. Although an attempt to tackle security is made, the result is too weak to be used for anything else than for personal purposes."

Other systems provide various details of the operation of wireless devices within a network, such as U.S. Pat. No. 6,418,324, Apparatus and Method for Transparent Wireless Communication; U.S. Pat. No. 6,418,146, Integrated Communication Center Functionality for WAP Devices; U.S. Pat. No. 6,359,880, Public Wireless/Cordless Internet Gateway; U.S. Pat. No. 6,334,056, Secure Gateway Processing for Handheld Device Markup Language; U.S. Pat. No. 6,317,594, System and Method for Providing Data to a Wireless Device Upon Detection of Activity of the Device on a Wireless Network; U.S. Pat. No. 6,282,183, Method for Authorizing Coupling between devices in a Capability Addressable Network; U.S. Pat. No. 6,272,129, Dynamic Allocation of Wireless Mobile Nodes Over An Internet Protocol (IP) Network; U.S. Pat. No. 6,167,428, Personal Computer Microprocessor Firewalls for Internet Distributed Processing; European Pat. No. 1225778, Wireless Repeater Using Identification of Call Originator; European Pat. No. EP 1191763, Access Authentication System for a Wireless Environment; European Pat. No. 1126681, A Network Portal System and Methods; European Pat. No. EP1081895, Secure Wireless Local Area Network; European Pat. No. EP 999672, System and Method for Mapping Packet Data Functional Entities to Elements in a Communications Network; European Pat. No. EP814623, Mobile Decision Methodology for Accessing Multiple Wireless Data Networks; Privacy and Authentication for Wireless Local Area Networks, Ashar Aziz and Whitfield Diffie; Sun Microsystems, Inc., Jul. 26, 1993; Painting Your Home Blue (Bluetooth™ Wireless Technology),D. Cypher, Proceedings 2002 IEEE 4$^{th}$ International Workshop on Networked Appliances, Jan. 15–16, 2002; Wireless Home Networks on a Hierarchical Bluetooth Scatternet Architecture, W. Lilakiatsakun, A. Seneviratne, Proceedings Ninth IEEE International Conference on Networks; Oct. 10–12, 2001; Bluetooth Wireless Technology in the Home, R. Shephard, Electronics & Communication Engineering Journal; October 2001; Wireless Gateway for Wireless Home AV Network and It's Implementation, T. Saito, I. Imoda, Y. Takabatke, K. Teramoto, and K. Fujimoto, IEEE Transactions on Consumer Electronics, August 2001; A Wireless Home Network and its Applications Systems, H. Fujieda, Y. Horiike, T. Yamamoto, and T. Nomura, IEEE Transactions on Consumer Electronics, May 2000; Wireless Home Link, M. Nakagawa, IEICE Transactions on Communications, December 1999; An Access Protocol for a Wireless Home Network, A. C. V. Gummalla, and J. O. Limb, WCNC 1999 IEEE Wireless Communications and Networking Conference; Sep. 21–24, 1999; Firewalls for Security in Wireless Networks, U. Murthy, O. Bukres, W. Winn, and E. Vanderdez, Proceedings of the Thirty-First Hawaii International Conference on System Sciences, Jan. 6–9, 1998; Self-Securing Ad Hoc Wireless Networks, Haiyun Luo, Petros Aerfos, Jiejun Kng, Songwu Lu, and Lixia Zhang; Wireless Networking for Control and Automation of Off-Road Equipment, J. D. Will; ASAE Meeting Presentation;

and *Intrusion Detection in Wireless Ad-Hoc Networks*, Yongguang Zhang and Wenke Lee, Proceeding of the Sixth Annual International Conference on Mobile Computing and Networking, Aug. 6–11, 2000.

The disclosed prior art systems and methodologies thus provide basic provisioning for wireless devices to a network through an access point. However, for many networks, such provisioning schemes are often impractical, either for wireless devices which lack a user interface which is configured for communicating provisioning information, or for simple home-based intranets. For example, device identification information, such as a MAC address, is often required to be manually transcribed from the wireless device to the access point, since wireless devices often lack a user interface control to reveal such identifying information. For example, a wireless picture frame device typically lacks a control interface to read or extract identification information, such as a MAC address.

While some wireless devices include a user interface for dedicated device functionality, e.g. such as a user control for a game box or a digital video recorder, a dedicated user interface is often incapable or cumbersome to be used to communicate device identification and to exchange provisioning information. In addition, while some wireless devices provide a user interface control which can reveal such identifying information, provisioning procedures still require a user to be technically proficient to properly initiate and complete a provisioning process.

It would therefore be advantageous to provide a network provisioning system, which does not require a user interface for the initiation of a provisioning process. The development of such a wireless access provisioning system would constitute a major technological advance.

Furthermore, it would be advantageous to provide a wireless access provisioning structure and process with minimal device requirements and/or user proficiency, whereby a wireless device is readily provisioned by the provisioning system, and whereby other devices within an access region are prevented from being provisioned by the provisioning system. The development of such a provisioning system would constitute a further technological advance.

As well, it would be advantageous that such a wireless access provisioning system be integrated with easily monitored parameters of a wireless device, such as the time monitoring of power on and/or start of signal transmission. The development of such a provisioning system would constitute a further major technological advance. The development of such a time-based wireless access provisioning system for provisioning secure encrypted communication would constitute a further technological advance.

SUMMARY OF THE INVENTION

A method and apparatus is provided for the time-based provisioning of wireless devices. A network access point monitors operation of wireless devices within a service region. When provisioning logic is activated at the network access point, the access point determines if the tracked parameter, such as the power on, of the wireless device occurs within a designated time interval from the time of the provisioning activation. If the tracked device qualifies, the network access point proceeds with provisioning the device. When a wireless device to be authorized is powered on, the provisioning logic at the network access point notes the power on time. The user then activates the provisioning access at the network access point, and the network access point provisions the wireless device if it is recently powered on.

BRIEF DESCRIPTION OF THE DRAWINGS

FIG. 7 shows the time-based acceptance and provisioning of a new wireless device within a time based wireless access provisioning system.

DETAILED DESCRIPTION OF PREFERRED EMBODIMENTS

Figure 1:
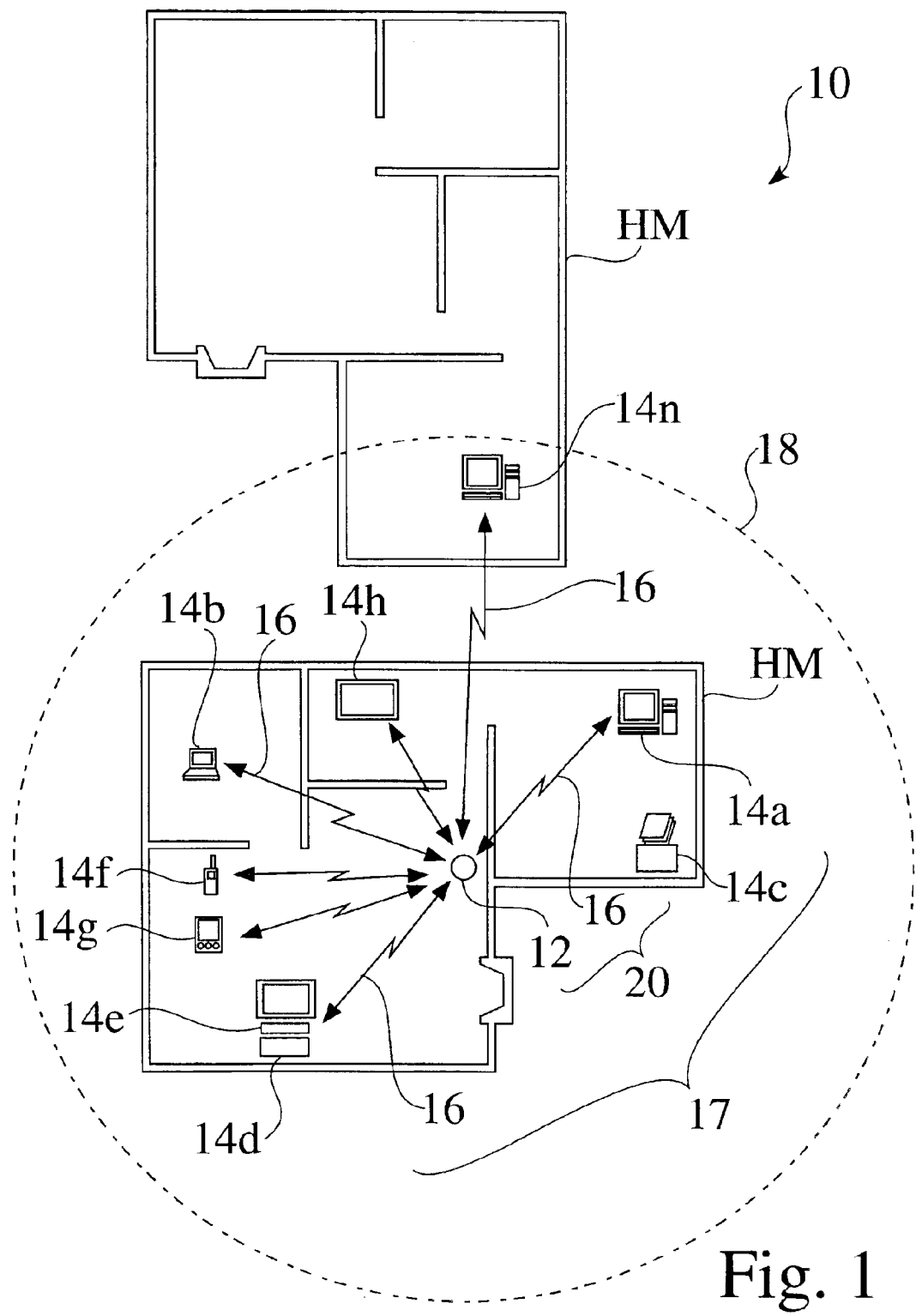
FIG. 1 is a schematic plan view of a time based wireless access provisioning system.
Figure 2:
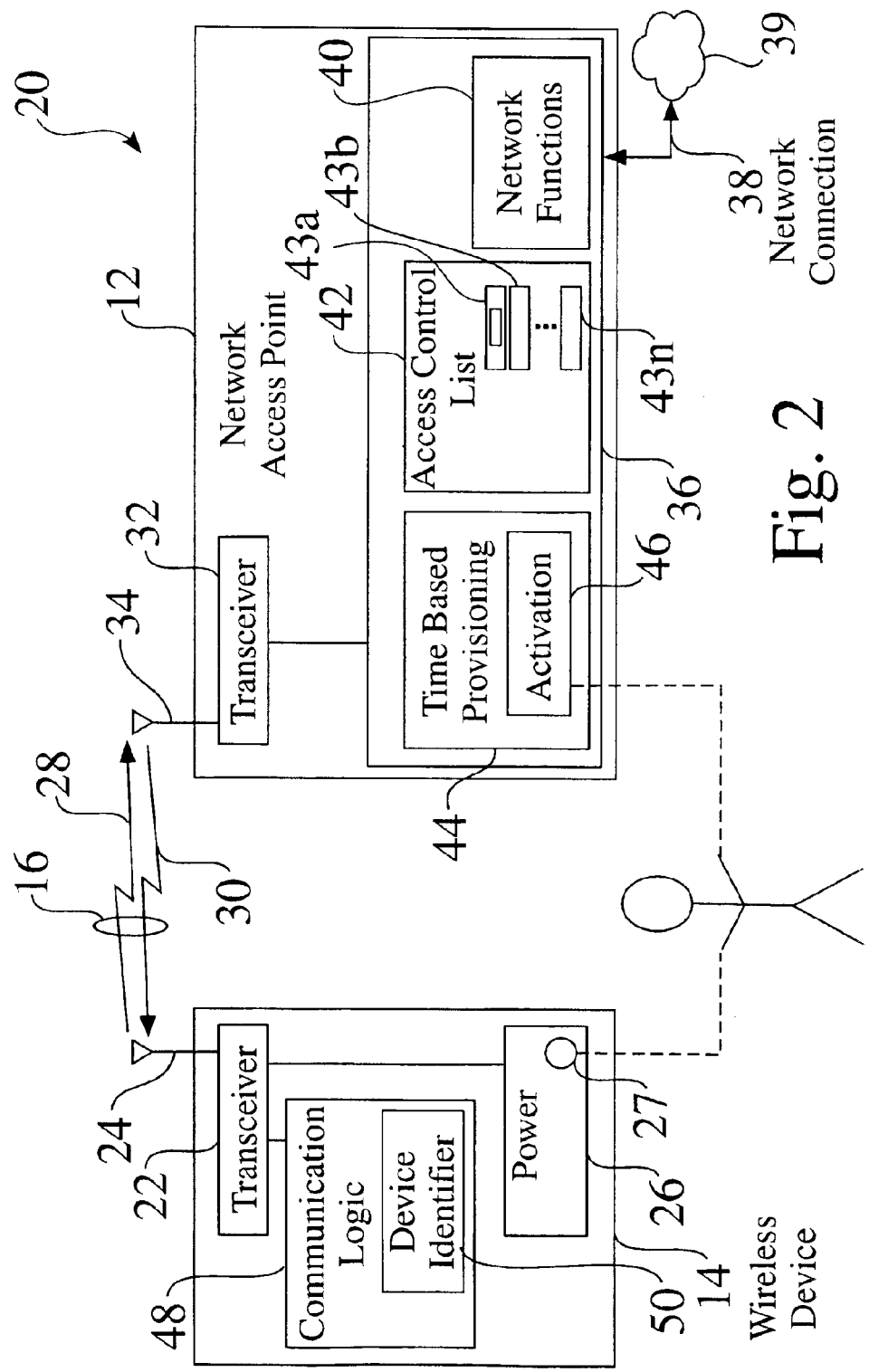
FIG. 2 is a functional block diagram of a time based wireless access provisioning system.

FIG. 1 is a schematic plan view 10 of a time based wireless access provisioning system 20. FIG. 2 is a functional block diagram of a time based wireless access provisioning system 20, comprising a network access point 12 adapted to provide time-based provisioning with a wireless device 14.

The network access point 12 shown in FIG. 2 comprises a transceiver 32 and antenna 34, which provides communication 16 to one or more wireless devices 14. The communications channel 16 typically comprises an input, i.e. reverse link, signal 28 from a wireless device 14 to the access point, as well as an output, i.e. forward link, signal 30, from the access point 12 to the wireless device 14.

As seen in FIG. 2, the network access point 12 typically comprises network logic and componentry 36, such as networking functions 40, thereby providing communications between one or more authorized wireless devices 14 and a local network 17 (FIG. 1). The network access point 12 shown in FIG. 2 also comprises a network connection 38 to one or more networks 39, such as to wired devices within a LAN, and/or to other networks, such as the Internet. The network access point 12 shown in FIG. 2 comprises an access control list 42, which identifies wireless devices 14 which have proper access to the local network 17 (FIG. 1), such as by storing accepted device identifications 50 as list elements 43a–43n.

The wireless device 14 shown in FIG. 2 comprises a device transceiver 22 and antenna 24, which provides communication 16 to the network access point 12, and in some embodiments to other wireless devices 14. The wireless device 14 comprises communication logic and componentry 48, and comprises an associated device identifier 50, e.g. such as a unique MAC address, which is communicatable to the network access point 12, whereby the wireless device 14 can be controllably provisioned into the network 17 by the network access point 12. The wireless device 14 also comprises power 26, e.g. wired or battery, and power activation 27. In some embodiments of the time based wireless access provisioning system 20, the wireless device 14 is an IEEE 802.11 WLAN and/or Bluetooth™ compliant device.

The network access point 12 shown in FIG. 1 is located within a service area 18 for a network 17, such as a wireless local area network (WLAN) or a wireless personal area network (WPAN), and typically communicates 16 with a one or more wireless devices 14 which operate within the service area 18, as well as to other wired devices connected to the network, and to connected 38 networks 39, such as the Internet.

As seen in FIG. 1, the time based wireless access provisioning system 20 can be used for a wide variety of wireless devices 14a–14n which are adapted to communicate with the network access point 12, such as but not limited to a desktop computer 14a, a portable laptop computer 14b, a network printer 14c, a digital video recorder 14d, a game box 14e, a portable phone 14f, a personal digital assistant (PDA) 14g, and/or a wireless picture frame 14h.

The network access point 12 provides time-based provisioning to ensure that only authorized wireless devices 14 can operate within the local network 17, such as within a home HM, and to prevent unauthorized wireless devices 14, such as device 14n in FIG. 1, from gaining access to the network 17.

In the time based wireless access provisioning system 20, the network access point 12 also comprises time based provisioning 44, which is activatible 46, such as manually by a user U. The time based wireless access provisioning system 20 securely integrates one or more wireless devices 14 into the local area network 17. A properly timed interaction 57 (FIG. 3, FIG. 4) between a wireless device 14 to be provisioned and the network access point 12 acts to qualify the wireless device 14 to the network access point.

Time-Based Provisioning Process.

Figure 3:
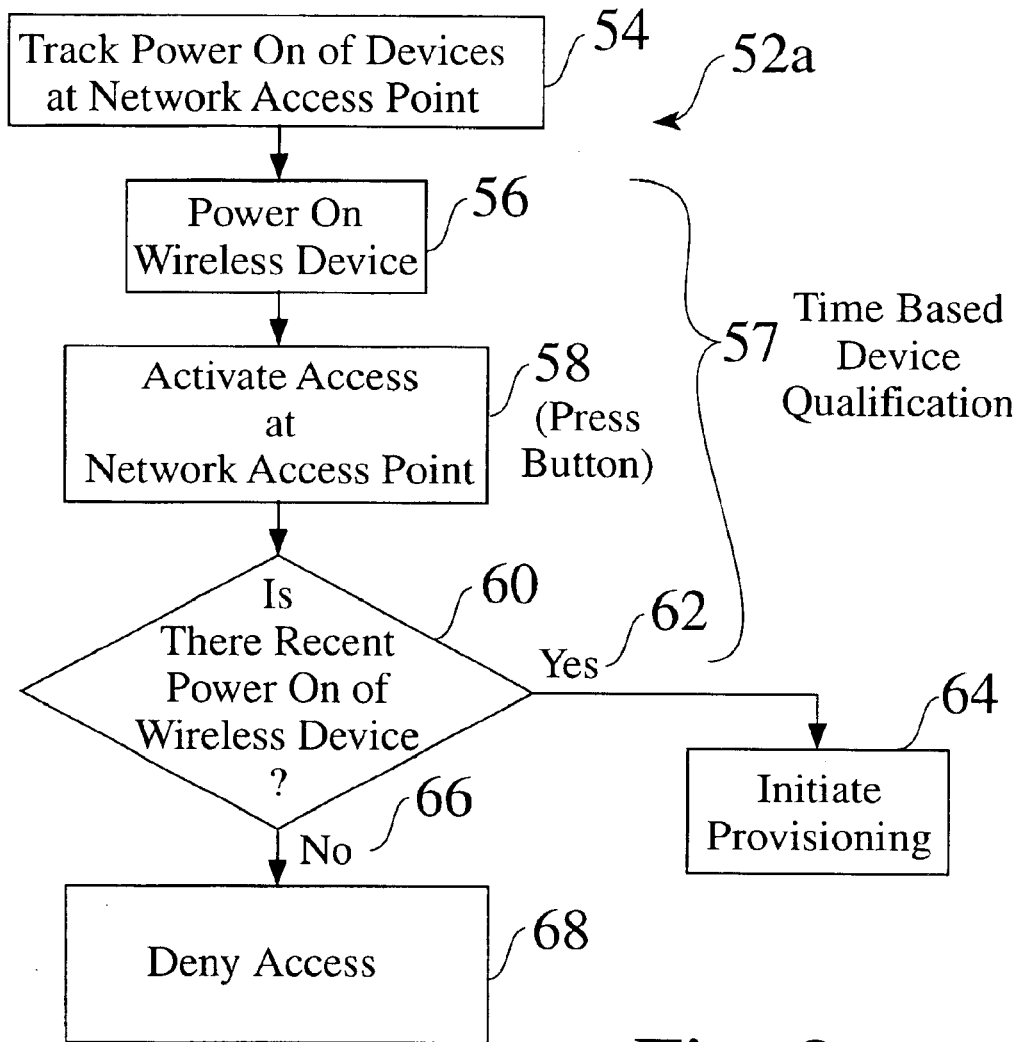
FIG. 3 is a flow chart of a time based wireless access provisioning process.
Figure 5:
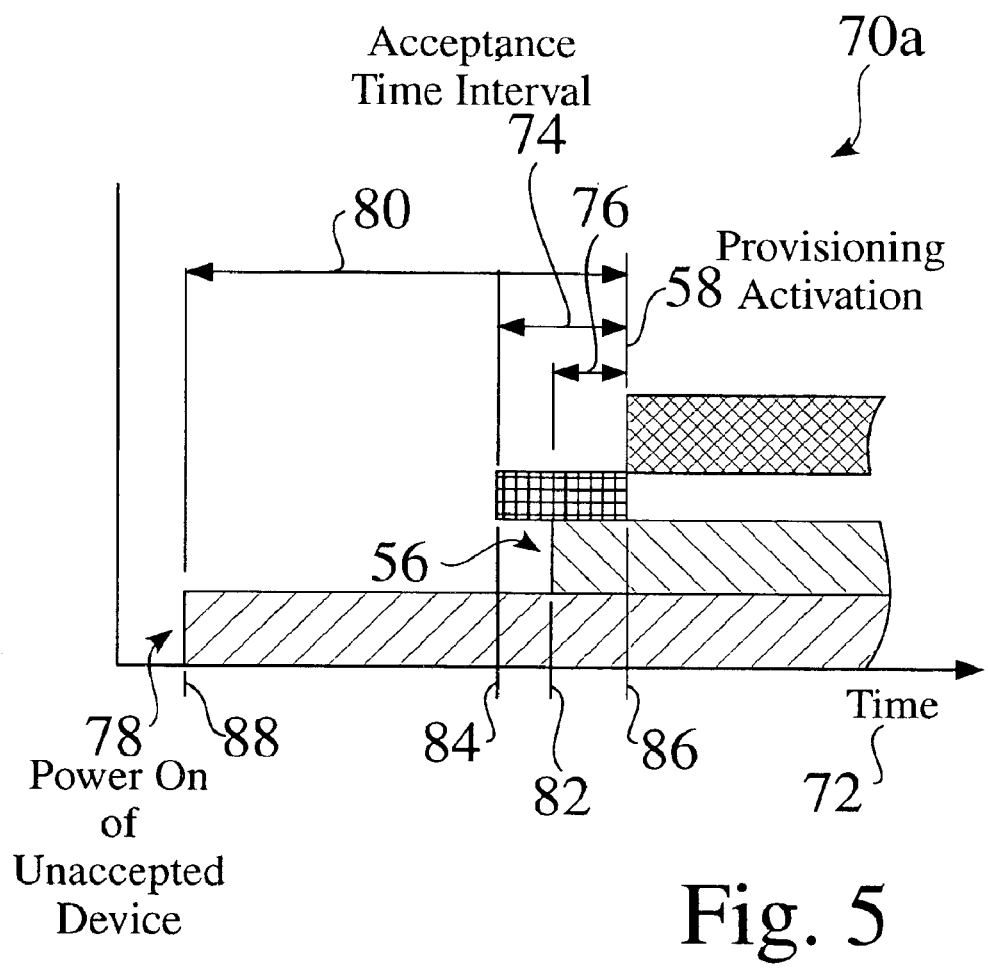
FIG. 5 shows a simplified timeline for a time based wireless access provisioning process.

FIG. 3 is a flow chart of a time based wireless access provisioning process 52a. The network access point 12 tracks 54 the power on time of wireless devices 14, whereby the powered wireless device begins transmission of a reverse link signal 28. When a wireless device 14 to be authorized is powered on 56, the provisioning logic 44 at the network access point 12 notes the power on time 82 (FIG. 5). The user U then activates 58 the provisioning access 44 at the network access point 12, typically by pressing an activation button or switch 46.

In response to a properly timed interaction 57, the network access point 12 provisions the wireless device 14 automatically. As seen in FIG. 3, the network access point 12 determines 60 if there is a recent power on of a wireless device 14, e.g. such as within 5 minutes. If the wireless device 14 was recently powered 56, such as within an acceptance time interval 74 (FIG. 5), the positive determination logic 62 allows the network access point 12 to initiate provisioning 64.

As seen in FIG. 3, the time based wireless access provisioning process 52a also prevents network access from devices 14 which are powered on 78 (FIG. 5) at an earlier time 88 (FIG. 5). If a wireless device 14 is powered on at a time 88 before the acceptance time interval 74 (FIG. 5), the negative determination logic 66 allows the network access point 12 to deny access 68 to the device, preventing provisioning 64 into the network 17.

FIG. 5 shows a simplified timeline 70a for a time based wireless access provisioning process 52a. The enhanced network access point 12 tracks power on 56 of wireless devices as a function of time 72. As seen in FIG. 5, the network access point 14 notes the start time 82 of the power on 56 of a wireless device 14 which is desired to be provisioned within the network 17. The user then activates provisioning logic 44 at the network access point 12, at time 86. The provisioning logic 44 typically comprises an acceptance time interval 74, e.g. such as a 5 minute interval 74, having a start time 84 and an end time 86, within which desired devices 14 are accepted 62 (FIG. 3). As seen in FIG. 5, the time interval 76 for the desired device 14 properly falls within the acceptance interval 74, such that the provisioning logic 44 accepts 62 the wireless device 14, and initiates provisioning 64.

As further seen in FIG. 5, the network access point 14 also notes the start time 88 of the power on 78 of a second wireless device 14, which is not necessarily desired to be provisioned by the network access point 12. When the user activates the provisioning logic 44 at the network access point 12, at time 86, the time interval 80 for the second device 14 falls outside the acceptance interval 74, i.e. failing 66 time-based determination 60 (FIG. 3) such that the provisioning logic 44 denies 68 the second wireless device 14, and prevents provisioning 64.

Alternate Time-Based Provisioning Process.

Figure 4:
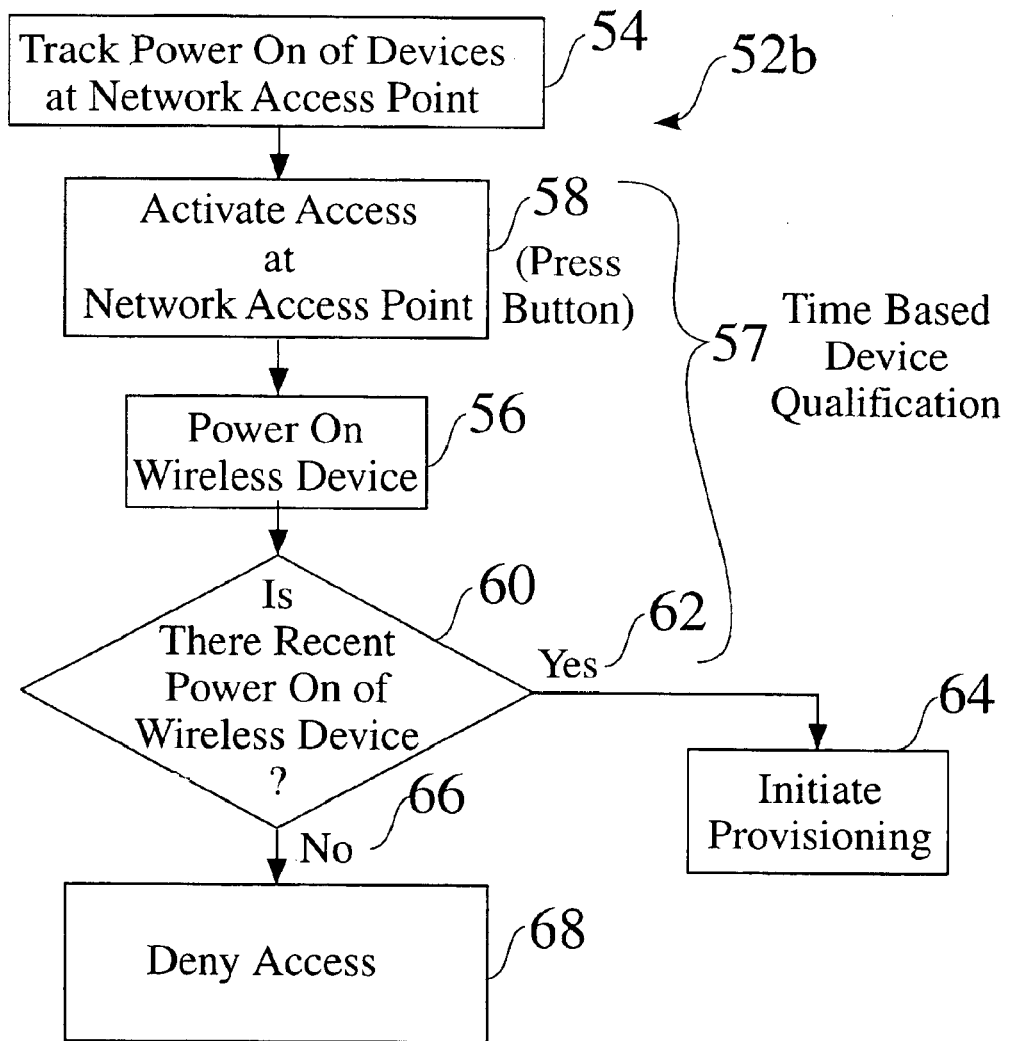
FIG. 4 is a flow chart of an alternate time based wireless access provisioning process.

FIG. 4 is a flow chart of an alternate time based wireless access provisioning process 52b, in which a desired wireless device 14 to be provisioned is powered on after the provisioning logic 44 is activated. As above, the network access point 12 tracks 54 the power on time of wireless devices 14, whereby the powered wireless device begins transmission of a reverse link signal 28. The user U then activates 58 the provisioning access 44 at the network access point 12, typically by pressing an activation button or switch 46. When a wireless device 14 to be authorized is powered on 56, the provisioning logic 44 at the network access point 12 notes the power on time 82 (FIG. 6).

In response to a properly timed interaction 57, the network access point 12 provisions the wireless device 14 automatically. As seen in FIG. 4, the network access point 12 determines 60 if there is a recent power on of a wireless device 14, after the provisioning logic 44 is activated 58. If the wireless device 14 was recently powered 56, such as within an acceptance time interval 74 (FIG. 6), the positive determination logic 62 allows the network access point 12 to initiate provisioning 64.

Figure 6:
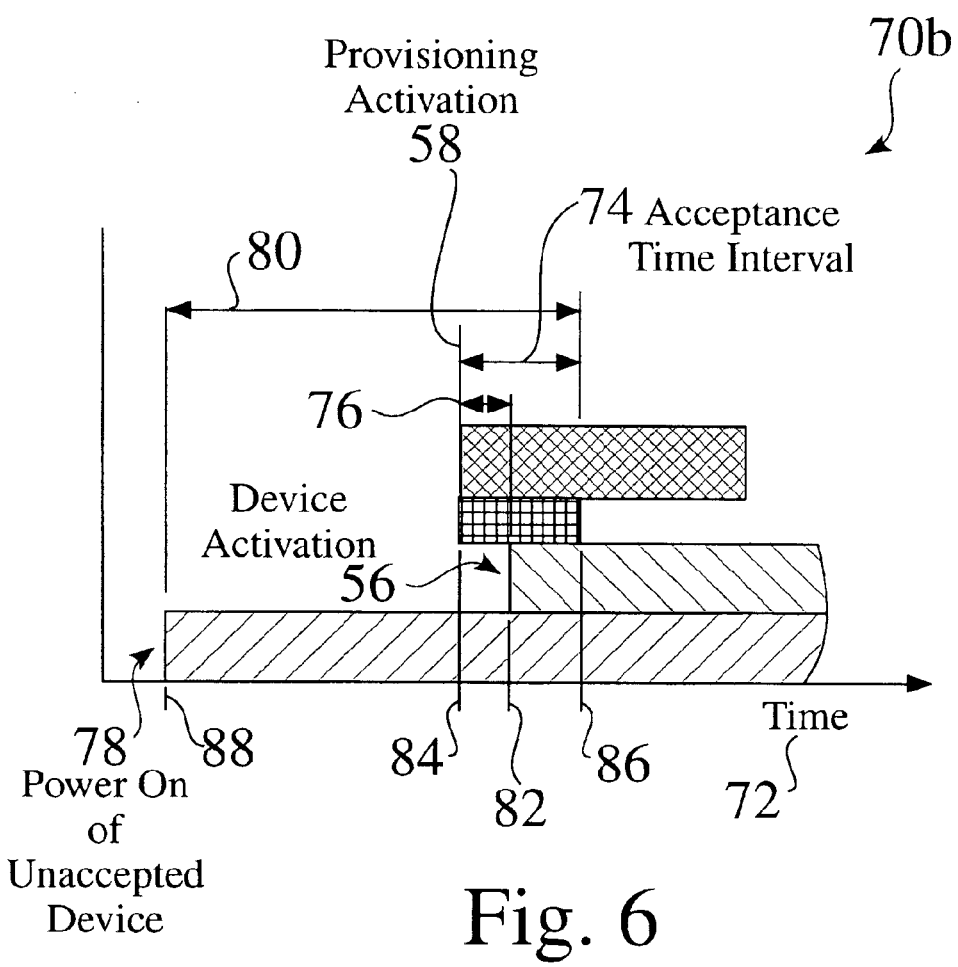
FIG. 6 shows a simplified timeline for an alternate time based wireless access provisioning process.

As seen in FIG. 4, the alternate time based wireless access provisioning process 52b also prevents network access from devices 14 which are powered on 78 (FIG. 6) at an earlier time 88 (FIG. 6). If a wireless device 14 is powered on at a time 88 before (or after) the acceptance time interval 74 (FIG. 6), the negative determination logic 66 allows the network access point 12 to deny access 68 to the device 14, preventing provisioning 64 into the network 17.

FIG. 6 shows a simplified timeline 70b for the alternate time based wireless access provisioning process 52b. The enhanced network access point 12 tracks power on 56 of wireless devices as a function of time 72. As seen in FIG. 6, the user activates provisioning logic 44 at the network access point 12, at time 84. The network access point 14 notes the start time 82 of the power on 56 of a wireless device 14 which is desired to be provisioned within the network 17. If the power on 56 falls within the acceptance time interval 74, the desired device 14 is accepted 62 (FIG. 4). As seen in FIG. 6, the time interval 76 for the desired device 14 properly falls within the acceptance interval 74, such that the provisioning logic 44 accepts 62 the wireless device 14, and initiates provisioning 64.

As further seen in FIG. 6, the network access point 14 also notes the start time 88 of the power on 78 of a second wireless device 14, which is not necessarily desired to be provisioned by the network access point 12, such as from an unauthorized device 14, or from a desired device which is not powered on within the time interval 74. When the user then activates the provisioning logic 44 at the network access point 12, at time 86, the time interval 80 for the second device 14 falls outside the acceptance interval 74, and before the activation 58 of the provisioning logic 44, such that the provisioning logic 44 denies 68 the second wireless device 14, and prevents provisioning 64.

Device Qualification.

FIG. 7 provides a schematic view 90 of a time-based acceptance of a new wireless device 14 within a time based wireless access provisioning system 20.

When the provisioning logic 44 time-qualifies 62 (FIG. 3, FIG. 4) a wireless device 14, the wireless access point 12 accepts the time-based qualification 57, and initiates the provisioning process 64, which typically comprises communication 16 and secure provisioning of information between the wireless device 14 and the network access point 12, such as the exchange of key material, if an encryption protocol is to be used. Device parameters, such as the device identifier 50, are typically sent 92 to the access point 12, wherein the device identifier 50 is added to the network access control list 42. As seen in FIG. 7, the device identifier 50 for the accepted wireless device 14 is added to the access control list 42, such as an element 43b in the list of qualified devices 14. Provisioning information may also be sent 94 from the network access point 12 to the device 14, such as to establish setup, handshaking, or encryption provisioning.

System Implementation.

The time-based wireless access provisioning system 20 readily integrates one or more wireless devices 14 into a local area network in a secure fashion. For example, when a user U brings home a new wireless device 14 for use in their existing home network 17, the time-based wireless access provisioning system 20 allows the user U to easily add the new device to the network 17, without exposing the network unnecessarily to attack from third parties.

Within the time based access provisioning system 20, the enhanced network access point 12 keeps track of all wireless devices 14a–14n in the vicinity 18 of the central access point 12. The time based wireless access provisioning system 20 securely integrates one or more wireless devices 14 into the local area network 17, based upon a properly timed device qualification interaction 57 (FIG. 3, FIG. 4) between a wireless device 14 to be provisioned and the network access point 12.

As seen in FIG. 3 and FIG. 4, when a user U brings a device 14 home HM and powers on the wireless device 14, the user then simply presses a button 46 on their network access point 12. In response thereto, the access point 12 provisions the wireless device automatically, based on the time-based qualification 57. Since the access point 12 is only available for such provisioning for a short interval 74 after the button 46 is pressed, it is unlikely that the access point 12 will provision unauthorized third party devices 14.

The qualification protocol 52a,52b allows the network access point 12 to augment the access control list 42 with a properly qualified device 14. The network access point can discount, i.e. deny, devices in neighboring residences HM that have been on for a long time, wherein power on 78 of the devices 14 extends beyond the acceptance interval 74, and can identify and provision one or more devices 14 that are powered on 56 within the acceptance interval 74.

The time-based access provisioning system 20 does not require a user interface on a wireless device 14 to initiate device setup and provisioning. As the power on or beginning of signal transmission 16 is easily tracked by the enhanced network access point 12, a simple activation 46, such as the pushing of a button 46, can be used to time-qualify 57 a desired device 14, and to deny qualification 66 for an unqualified device. Therefore, the time-based access provisioning system 20 drastically simplifies wireless setup and provisioning for wireless devices. Wireless devices 14 to be provisioned are not required to have complex user interfaces, and users are not required to perform complex provisioning procedures. The time-based access provisioning system 20 simplifies the integration of wireless devices into a network, and provides more than reasonable levels of security.

Alternate Applications for the Time-Based Access Provisioning System.

While the time based access provisioning system 10 is disclosed above as tracking a single power on 56,78 of wireless devices, alternate embodiments of the time based access provisioning system 10 provide further network protections from undesired devices.

For example, for a neighboring device which is switched on and off repeatedly, such as for an undesired wireless device or user in search of a network access point 12, the network access point 12 tracks the repeated powering operation, and can deny provisioning access as desired.

Although the time based access provisioning system and its methods of use are described herein in connection with wireless devices, personal computers and other microprocessor-based devices, such as wireless appliances, the apparatus and techniques can be implemented for a wide variety of electronic devices and systems, or any combination thereof, as desired.

Furthermore, while the time based access provisioning system and its methods of use are described herein in connection with wireless devices and intranets or LAN's, the apparatus and techniques can be implemented for a wide variety of electronic devices and networks or any combination thereof, as desired.

As well, while the time based access provisioning system and its methods of use are described herein in connection with a time based interaction between a wireless device and a network access point, the use of tracking power on/off as a signal to associate devices automatically can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process for provisioning between a wireless device and a network, comprising the steps of:
   providing an access point connected to the network, the access point comprising logic for determining the power on time of the wireless device;
   powering on the wireless device;
   activating a time interval; and
   initiating provisioning with the wireless device if the power on of the wireless device occurs within the time interval.

2. The process of claim 1, wherein the wireless device is any of a computer, a portable computer, a printer, a portable phone, a personal digital assistant, a wireless picture frame, a video recording device, an electronic game device, a television, a digital camera, a digital video camera, and a digital music player.

3. The process of claim 1, wherein the wireless device is an IEEE 802.11 compliant device.

4. The process of claim 1, wherein the wireless device is a BLUETOOTH™ compliant device.

5. The process of claim 1, wherein the network is a local area network.

6. The process of claim 1, wherein the network is a wireless local area network.

7. The process of claim 1, wherein the network is connected to the Internet.

8. The process of claim 1, further comprising the step of:
preventing provisioning with the wireless device if the power on of the wireless device is greater than the time interval.

9. The process of claim 1, wherein the access point comprises an access control list comprising storage for a device identifier corresponding to a wireless device which is provisioned to access the network.

10. The process of claim 9, wherein the device identifier is a MAC address.

11. The process of claim 1, wherein the provisioning comprises associating a received device identifier with the wireless device.

12. The process of claim 1, wherein the provisioning comprises storing a MAC address from the wireless device.

13. The process of claim 1, wherein the provisioning comprises a communication of an access control list to the wireless device.

14. The process of claim 1, wherein the wireless device further comprises a device identifier, and wherein the provisioning comprises communicating the device identifier to the access point.

15. The process of claim 1, wherein the provisioning comprises establishing an encrypted connection between the wireless device and the network.

16. The process of claim 1, wherein the provisioning comprises an established connection between the wireless device and at least one other provisioned wireless device.

17. A time based network access provisioning system between a wireless device and a network, comprising:
a network access point connected to the network, the network access point comprising logic for tracking operation of the wireless device; and
logic for provisioning the wireless device if the operation of the wireless device occurs within an activatible time interval.

18. The system of claim 17, wherein the wireless device is any of a computer, a portable computer, a printer, a portable phone, a personal digital assistant, a wireless picture frame, a video recording device, an electronic game device, a television, a digital camera, a digital video camera, and a digital music player.

19. The system of claim 17, wherein the wireless device is an IEEE 802.11 compliant device.

20. The system of claim 17, wherein the wireless device is a BLUETOOTH™ compliant device.

21. The system of claim 17, wherein the network is a local area network.

22. The system of claim 17, wherein the network is a wireless local area network.

23. The system of claim 17, wherein the network is connected to the Internet.

24. The system of claim 17, further comprising:
logic for preventing provisioning with the wireless device if the power on of the wireless device is greeter than the time interval.

25. The system of claim 17, wherein the access point comprises an access control list comprising storage for a device identifier corresponding to a wireless device which is provisioned to access the network.

26. The system of claim 25, wherein the device identifier is a MAC address.

27. The system of claim 17, wherein the provisioning logic comprises an association of a received device identifier with the wireless device.

28. The system of claim 17, wherein the provisioning logic comprises means for storing a MAC address associated with the wireless device.

29. The system of claim 17, wherein the provisioning logic comprises a communication of an access control list to the wireless device.

30. The system of claim 17, wherein the provisioning logic comprises an established encrypted connection between the wireless device and the network.

31. The system of claim 17, wherein the provisioning comprises establishing an encrypted connection between the wireless device and the network.

32. The system of claim 17, wherein the provisioning logic comprises an established connection between the wireless device and at least one other provisioned wireless device.

33. A process for provisioning between a wireless device and a network, comprising the steps of:
providing an access point connected to the network, the access point comprising logic for determining the time of power on of the wireless device;
determining of the wireless device is powered within a specified interval; and
initiating provisioning of the wireless device if the powering occurs within the interval.

34. The process of claim 33, wherein the wireless device is any of a computer, a portable computer, a printer, a portable phone, a personal digital assistant, a wireless picture frame, a video recording device, an electronic game device, a television, a digital camera, a digital video camera, and a digital music player.

35. The process of claim 33, wherein the wireless device comprises any of an IEEE 802.11 compliant device and a BLUETOOTH™ compliant device.

36. The process of claim 33, wherein the network comprises any of a local area network and a wireless local area network.

37. The process of claim 33, wherein the network is connected to the Internet.

38. The process of claim 33, further comprising the step of:
preventing provisioning with the wireless device if the power on of the wireless device is greater than the time interval.

39. The process of claim 33, wherein the access point comprises an access control list comprising storage for a device identifier corresponding to at least one wireless device which is provisioned to access the network.

40. The process of claim 39, wherein the device identifier is a MAC address.

41. The process of claim 33, wherein the provisioning comprises associating a received device identifier with the wireless device.

42. The process of claim 33, wherein the provisioning comprises a communication of an access control list to the wireless device.

43. The process of claim 33, wherein the wireless device further comprises a device identifier, and wherein the provisioning comprises communicating the device identifier to the access point.

44. The process of claim 33, wherein the provisioning comprises establishing an encrypted connection between the wireless device and the network.

45. The process of claim 33, wherein the provisioning comprises an established connection between the wireless device and at least one other provisioned wireless device.

46. A process for provisioning between a wireless device and a network, the wireless device having a transmitted signal, comprising the steps of:

providing an access point connected to a network, the access point comprising an activatible provisioning time interval; and initiating provisioning of the wireless device if the transmission of the wireless signal from the wireless device to the access point begins during the interval.

47. The process of claim 46, wherein the wireless device is any of a computer, a portable computer, a printer, a portable phone, a personal digital assistant, a wireless picture frame, a video recording device, an electronic game device, a television, a digital camera, a digital video camera, and a digital music player.

48. The process of claim 46, wherein the wireless device comprises any of an IEEE 802.11 compliant device and a BLUETOOTH™ compliant device.

49. The process of claim 46, wherein the network comprises any of a local area network and a wireless local area network.

50. The process of claim 46, wherein the network is connected to the Internet.

51. The process of claim 46, further comprising the step of:

preventing provisioning with the wireless device if the transmission of the wireless device signal begins outside of the time interval.

52. The process of claim 46, wherein the access point comprises an access control list comprising storage for a device identifier corresponding to at least one wireless device which is provisioned to access the network.

53. The process of claim 52, wherein the device identifier is a MAC address.

54. The process of claim 46, wherein the provisioning comprises associating a received device identifier with the wireless device.

55. The process of claim 46, wherein the provisioning comprises a communication of an access control list to the wireless device.

56. The process of claim 46, wherein the wireless device further comprises a device identifier, and wherein the provisioning comprises communicating the device identifier to the access point.

57. The process of claim 46, wherein the provisioning comprises establishing an encrypted connection between the wireless device and the network.

58. The process of claim 46, wherein the provisioning comprises an established connection between the wireless device and at least one other provisioned wireless device.

59. A network access point, comprising:

a connection to a network;

a receiver for receiving input signals from at least one wireless device;

means for provisioning access between the wireless device and the network; and a time-based interval which selectably allows the provisioning if a received input signal occurs within the time interval.

60. The network access point of claim 59, wherein the wireless device is any of a computer, a portable computer, a printer, a portable phone, a personal digital assistant, a wireless picture frame, a video recording device, an electronic game device, a television, a digital camera, a digital video camera, and a digital music player.

61. The network access point of claim 59, wherein the wireless device comprises any of an IEEE 802.11 compliant device and a BLUETOOTH™ compliant device.

62. The network access point of claim 59, wherein the network comprises any of a local area network and a wireless local area network.

63. The network access point of claim 59, wherein the network is connected to the Internet.

64. The network access point of claim 59, further comprising:

logic for preventing provisioning with the wireless device if the power on of the wireless device is greater than the time interval.

65. The network access point of claim 59, wherein the access point comprises an access control list comprising storage for a device identifier corresponding to a wireless device which is provisioned to access the network.

66. The network access point of claim 64, wherein the device identifier is a MAC address.

67. The network access point of claim 59, wherein the provisioning means comprises an association of a received device identifier with the wireless device.

68. The network access point of claim 59, wherein the provisioning means comprises a communication of an access control list to the wireless device.

69. The network access point of claim 59, wherein the wireless device further comprises a device identifier, and wherein the provisioning means comprises a communication of the device identifier to the access point.

70. The network access point of claim 59, wherein the provisioning means comprises an established encrypted connection between the wireless device and the network.

71. The network access point of claim 59, wherein the provisioning means comprises an established connection between the wireless device and at least one other provisioned wireless device.

* * * * *